US010576624B2

(12) United States Patent
Nagatsuka

(10) Patent No.: US 10,576,624 B2
(45) Date of Patent: Mar. 3, 2020

(54) ROTATIONAL DRIVING MECHANISM IN A ROBOT

(71) Applicant: THK CO., LTD., Tokyo (JP)

(72) Inventor: Masaki Nagatsuka, Tokyo (JP)

(73) Assignee: THK CO., LTD., Tokyo (JP)

(*) Notice: Subject to any disclaimer, the term of this patent is extended or adjusted under 35 U.S.C. 154(b) by 275 days.

(21) Appl. No.: 15/522,548

(22) PCT Filed: Oct. 27, 2015

(86) PCT No.: PCT/JP2015/080161
§ 371 (c)(1),
(2) Date: Apr. 27, 2017

(87) PCT Pub. No.: WO2016/068098
PCT Pub. Date: May 6, 2016

(65) Prior Publication Data
US 2018/0290295 A1 Oct. 11, 2018

(30) Foreign Application Priority Data
Oct. 28, 2014 (JP) .................................. 2014-219175

(51) Int. Cl.
*B25J 9/10* (2006.01)
*B25J 17/00* (2006.01)
*B25J 18/00* (2006.01)

(52) U.S. Cl.
CPC ............... *B25J 9/106* (2013.01); *B25J 17/00* (2013.01); *B25J 18/00* (2013.01)

(58) Field of Classification Search
CPC ............. B25J 9/106; B25J 17/00; B25J 18/00
See application file for complete search history.

(56) References Cited

U.S. PATENT DOCUMENTS 4,300,362 A * 11/1981 Lande .................. B23Q 1/50
414/1
5,216,930 A 6/1993 McNamara
(Continued)

FOREIGN PATENT DOCUMENTS

JP 2004-141976 A 5/2004
JP 2008-307310 A 12/2008
(Continued)

OTHER PUBLICATIONS

Notification of Transmittal of Translation of the International Preliminary Report on Patentability (Form PCT/IB/338) issued in counterpart International Application No. PCT/JP2015/080161 dated May 11, 2017, with Forms PCT/IB/373 and PCT/ISA/237. (7 pages).
(Continued)

*Primary Examiner* — Vicky A Johnson
(74) *Attorney, Agent, or Firm* — Westerman, Hattori, Daniels & Adrian, LLP; John P. Kong

(57) ABSTRACT

A rotational driving mechanism for driving a first member and a second member, which are part of a robot, to rotate relatively on a predetermined rotational driving plane by means of a linear motion actuator having a linear motion output shaft, includes: a first link unit with which the output shaft is connected, and which is arranged so as to be rotatable with respect to the first member through a first rotation shaft, and which is also arranged so as to be rotatable with respect to the second member side through a second rotation shaft; a second link unit which is connected with a first support shaft arranged at the first member side, and which is connected with a second support shaft arranged at the second member side, with a center distance between the first support shaft and the second support shaft being made constant.

9 Claims, 12 Drawing Sheets

(56) References Cited

U.S. PATENT DOCUMENTS

| | | | | |
|---|---|---|---|---|
| 5,379,664 | A * | 1/1995 | Kershaw | B25J 9/146 |
| | | | | 74/490.05 |
| 7,581,465 | B2 * | 9/2009 | Sugawara | B25J 5/00 |
| | | | | 74/490.05 |
| 2006/0015214 | A1 | 1/2006 | Sugawara et al. | |
| 2008/0310945 | A1 | 12/2008 | Tsujita et al. | |
| 2009/0071282 | A1 | 3/2009 | Takemura | |
| 2013/0197492 | A1 | 8/2013 | Kishi et al. | |
| 2013/0263685 | A1 | 10/2013 | Doyle | |
| 2014/0238177 | A1 * | 8/2014 | Nagatsuka | B25J 17/0266 |
| | | | | 74/490.06 |
| 2014/0331806 | A1 * | 11/2014 | Nagatsuka | B25J 9/0051 |
| | | | | 74/490.01 |
| 2017/0274525 | A1 * | 9/2017 | Nagatsuka | B25J 17/00 |
| 2017/0326736 | A1 * | 11/2017 | Nagatsuka | B25J 17/00 |
| 2018/0290295 | A1 * | 10/2018 | Nagatsuka | B25J 17/00 |

FOREIGN PATENT DOCUMENTS

| | | | |
|---|---|---|---|
| WO | 2007/009240 A1 | 1/2007 | |
| WO | WO-2008136402 A1 * | 11/2008 | ............. B25J 9/106 |
| WO | 2012/042949 A1 | 4/2012 | |
| WO | 2013/084789 A1 | 6/2013 | |

OTHER PUBLICATIONS

Office Action dated Oct. 4, 2016. issued in counterpart Japanese application No. 2015-208410, with English translation (5 pages).
International Search Report dated Dec. 15, 2015, issued in counterpart International Application No. PCT/JP2015/080161 (2 pages).
Office Action dated Aug. 14, 2019, issued in counterpart DE application No. 11 2015 004 892.8, with English translation. (14 pages).

* cited by examiner

ROTATIONAL DRIVING MECHANISM IN A ROBOT

TECHNICAL FIELD

The present invention relates to a rotational driving mechanism for rotationally driving members, which are part of a robot, relative to each other.

BACKGROUND ART

In recent years, there have been actively made research and development of not only industrial robots but also consumer robots, which play various roles for people's livelihood. Among such robots, human-like robots (humanoid robot) being able to walk in erect posture are expected to be able to substitute for actions of human beings. In such humanoid robots, many joint parts are provided for imitating actions or motions of a human being, and a variety of motions having a plurality of degrees of freedom in the joint parts are required.

For example, in FIG. 6 of patent literature 1, there is disclosed a joint structure of a leg unit of a robot. Specifically, a thigh part located at an upper side of the leg unit and a crus part located at a lower side of the leg unit are connected with a plate member so as to be rotatable relative thereto. Then, these parts and member are arranged in such a manner that when the leg unit becomes the most extended state, the plate member abuts against a stopper at the side of the thigh part and a stopper at the side of the crus part. With such an arrangement, when the robot extends its leg units and stands erect, each stopper and the plate member become an abutted state due to the self weight of the robot, so it becomes possible to maintain the erect state of the robot in a relatively stable manner. In addition, in order to maintain the contact state of the stoppers and the plate member at the time of the erect standing of the robot, an arrangement is also adopted in which springs are provided at the thigh part side and at the crus part side, respectively, to apply resilient forces.

CITATION LIST

Patent Literature

[Patent Literature 1] International laid-open publication No. 2013/084789

SUMMARY OF THE INVENTION

Technical Problem

In a construction in which a plurality of members are rotatably connected with each other at a joint part, as in a leg unit, an arm unit, etc., which are part of the robot, (hereinafter, referred to as a "robot construction unit"), in order to expand the movable range of the robot as much as possible and to improve the versatility thereof, too, it is preferable that the rotation range of the members in each joint part be as wide as possible. However, in general, in the interior of each of the members which form the robot construction unit, a large number of electrical components, such as actuators for driving each joint part, power cables, signal cables, etc., in addition to a skeletal structure for strengthening rigidity are accommodated, and each member is also a structural body having a fixed size.

For that reason, when the individual members of the robot construction unit are driven to rotate with respect to each other, the movable range of each member will be decided within a range in which the outside surfaces of the individual members defined by the sizes thereof do not contact and interfere with each other, and it is difficult to make the movable range relatively wide. On the other hand, in order to avoid the interference between the individual members of the robot construction unit, it is necessary to provide a predetermined deformation to each of the members by scooping their outside surfaces, etc., at a location at which they interfere with each other, but in that case, the skeletal structure inside each member, the arrangement of electrical components therein, etc., must be changed, so that the degree of design freedom of the robot is reduced to a large extent.

The present invention has been made in view of the problems as mentioned above, and has for its object to provide a rotational driving mechanism in a robot which is arranged between two members to be driven to rotate relative to each other, and in which a rotation range between both the members can be made as wide as possible, without adding a large change to the shapes of the outer surfaces of both the members.

Solution to Problem

In the present invention, in order to solve the above-mentioned problems, there is adopted a construction which corresponds to a joint part between a first member and a second member performing a relative rotational movement, and which serves to associate the first member and the second member with each other by means of a first link unit with which the first member and the second member are respectively connected in such a manner as to be rotatable, and a second link unit by which a center distance between a first support shaft at the side of the first member and a second support shaft at the side of the second member is made constant. With this, a space for rotational driving can be obtained between the first member and the second member, thus making it possible to avoid interference of both the members.

Specifically, a rotational driving mechanism according to the present invention is a rotational driving mechanism for driving a first member and a second member, which are part of a robot, to rotate relatively on a predetermined rotational driving plane by means of a linear motion actuator having an output shaft that moves linearly, the rotational driving mechanism comprising: a first link unit with which an output shaft of the linear motion actuator is connected, and which is arranged so as to be rotatable with respect to the first member through a first rotation shaft, and which is also arranged so as to be rotatable with respect to the second member side through a second rotation shaft, with a center distance between the first rotation shaft and the second rotation shaft being set to a predetermined distance which enables rotational driving of the first member and the second member on the predetermined rotational driving plane; and a second link unit which is connected with a first support shaft arranged at the first member side, and which is connected with a second support shaft arranged at the second member side, with a center distance between the first support shaft and the second support shaft being made constant. Further, the first support shaft and the second support shaft are arranged with respect to the first rotation shaft and the second rotation shaft in such a manner that a straight line connecting the first support shaft and the second support shaft intersects a straight line connecting the first rotation shaft and the second rotation shaft on the predetermined rotational driving plane.

The rotational driving mechanism according to the present invention is a mechanism for achieving relative rotational driving between the first member and the second member, and is provided with the first link unit and the second link unit. The first link unit is a link member with which the first member and the second member are connected through the first rotation shaft and the second rotation shaft, respectively, so as to be rotatable. Accordingly, although the first member and the second member are driven to rotate relative to each other, these members are not directly connected with each other so as to be mutually rotatable, but they are connected with each other through the first link unit so that they become rotatable on the different rotation shafts, respectively. The plane of rotation of each of these members corresponds to the predetermined rotational driving plane. For that reason, between the first member rotating around the first rotation shaft and the second member rotating around the second rotation shaft, there is formed a separate space corresponding to the predetermined distance which is the center distance between both the rotation shafts, and hence, due to the existence of the separate space, the first member and the second member become difficult to interfere with each other in the rotational driving on the predetermined rotational driving plane. With this, it becomes possible to achieve relative rotational driving between the first member and the second member in a wider range.

On the other hand, by connecting the first member and the second member with each other by means of the first rotation shaft and the second rotation shaft, respectively, both the members become a state where they are structurally independent from each other in the relative rotational driving between the first member and the second member. Accordingly, both the members are connected with each other through the second link unit. Specifically, the second link unit is connected with both the first and second support shafts so that the center distance between the first support shaft arranged at the first member side and the second support shaft arranged at the second member side becomes constant, as mentioned above. Then, these four shafts are arranged in such a manner that the straight line connecting the first support shaft and the second support shaft intersects the straight line connecting the first rotation shaft and the second rotation shaft, on the predetermined rotational driving plane. With this arrangement, the relative rotational driving of the first member and the second member becomes possible in a state where the distance between the first support shaft and the second support shaft has been made constant by the second link unit.

As described above, when an output from the linear motion actuator is applied to the rotational driving mechanism according to the present invention, for example, the first member is driven to rotate around the first rotation shaft with respect to the first link unit. At this time, because the first member is connected with the second member through the second link unit, the second member will be driven to rotate around the second rotation shaft with respect to the first link unit, in conjunction with the rotation of the first member, thereby making it possible to achieve relative rotational driving between the first member and the second member. According to such a rotational driving mechanism of the present invention, the relative rotational driving of the first member and the second member, which are connected with each other through the two different rotation shafts, can be achieved by the single linear motion actuator, as a consequence of which the volume of the space required to arrange the actuator can be made small, and the interference of both the members can be avoided as much as possible. As a result, it becomes possible to make the rotation range between the first member and the second member as wide as possible, without adding a large change to the shapes of the outer surfaces of both the members.

Advantageous Effects of Invention

It is possible to provide a rotational driving mechanism in a robot, which is arranged between two members to be driven to rotate relative to each other, and in which a rotation range between both the members can be made as wide as possible, without adding a large change to the shapes of the outer surfaces of both the members.

MODES FOR CARRYING OUT THE INVENTION

Hereinafter, specific modes or embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

<Construction of Robot 10>

Figure 1:
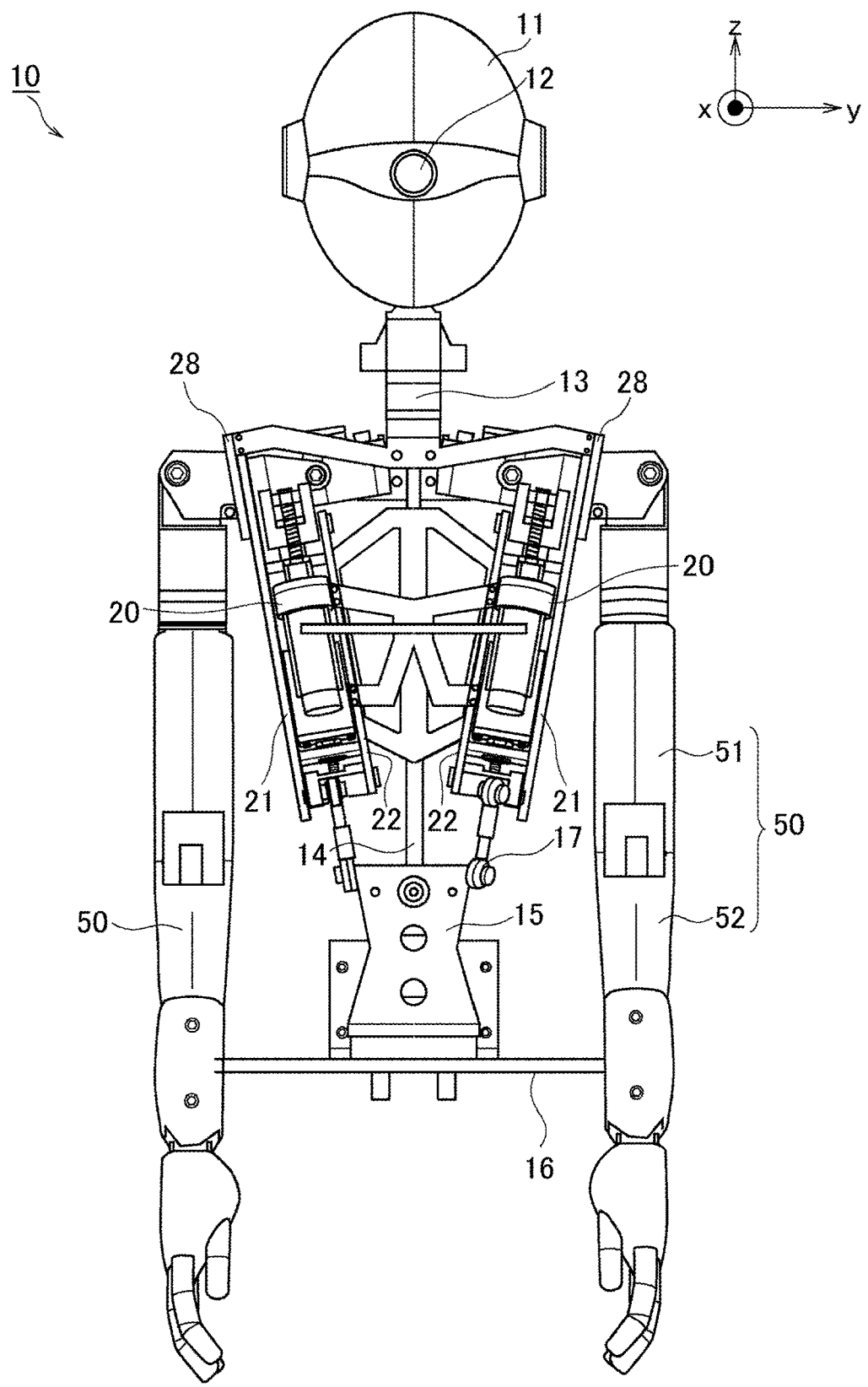
FIG. 1 is a front elevation of a robot to which rotational driving mechanisms according to the present invention is applied.
Figure 2:
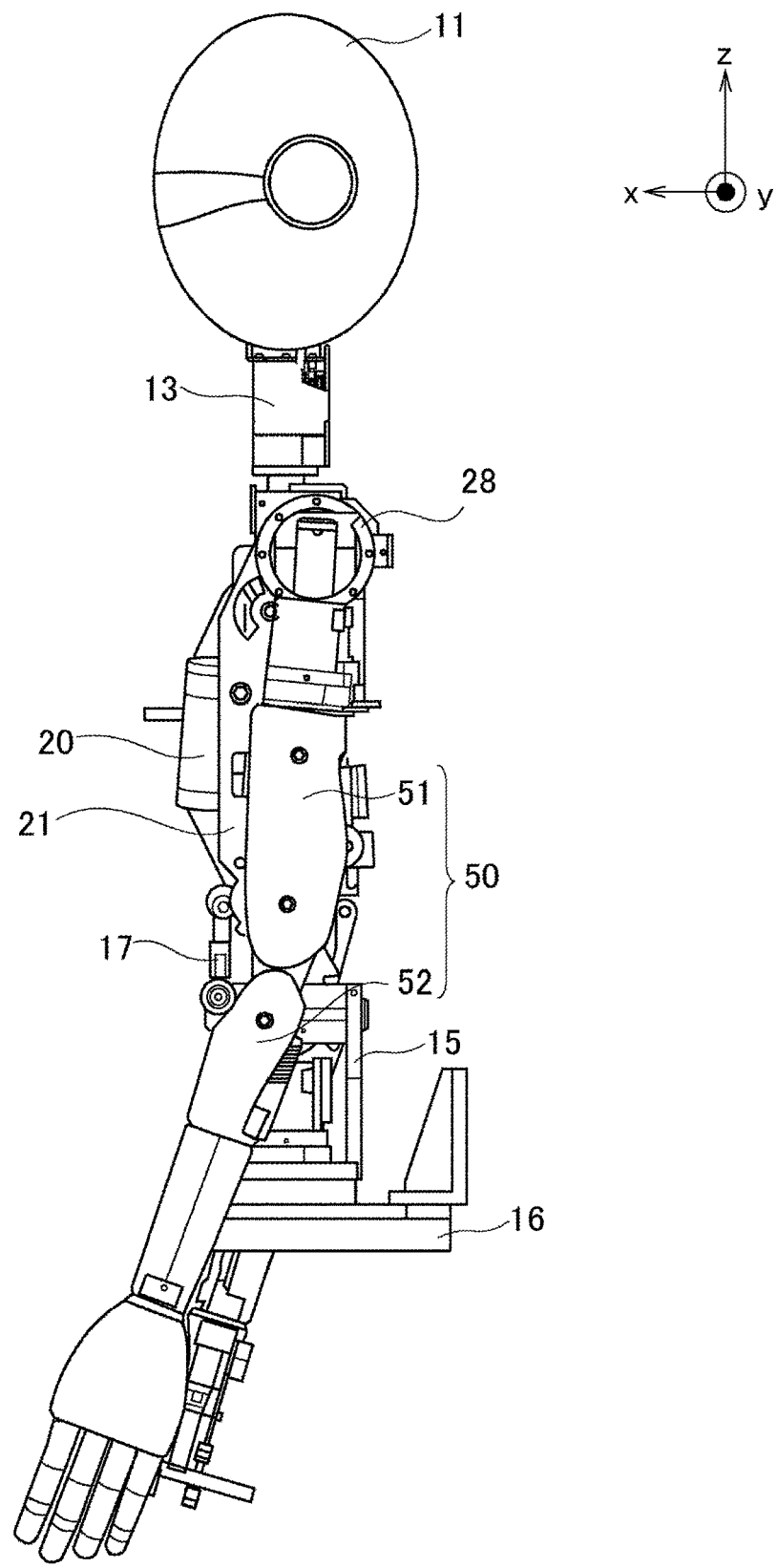
FIG. 2 is a side elevation of the robot shown in FIG. 1.
Figure 3:
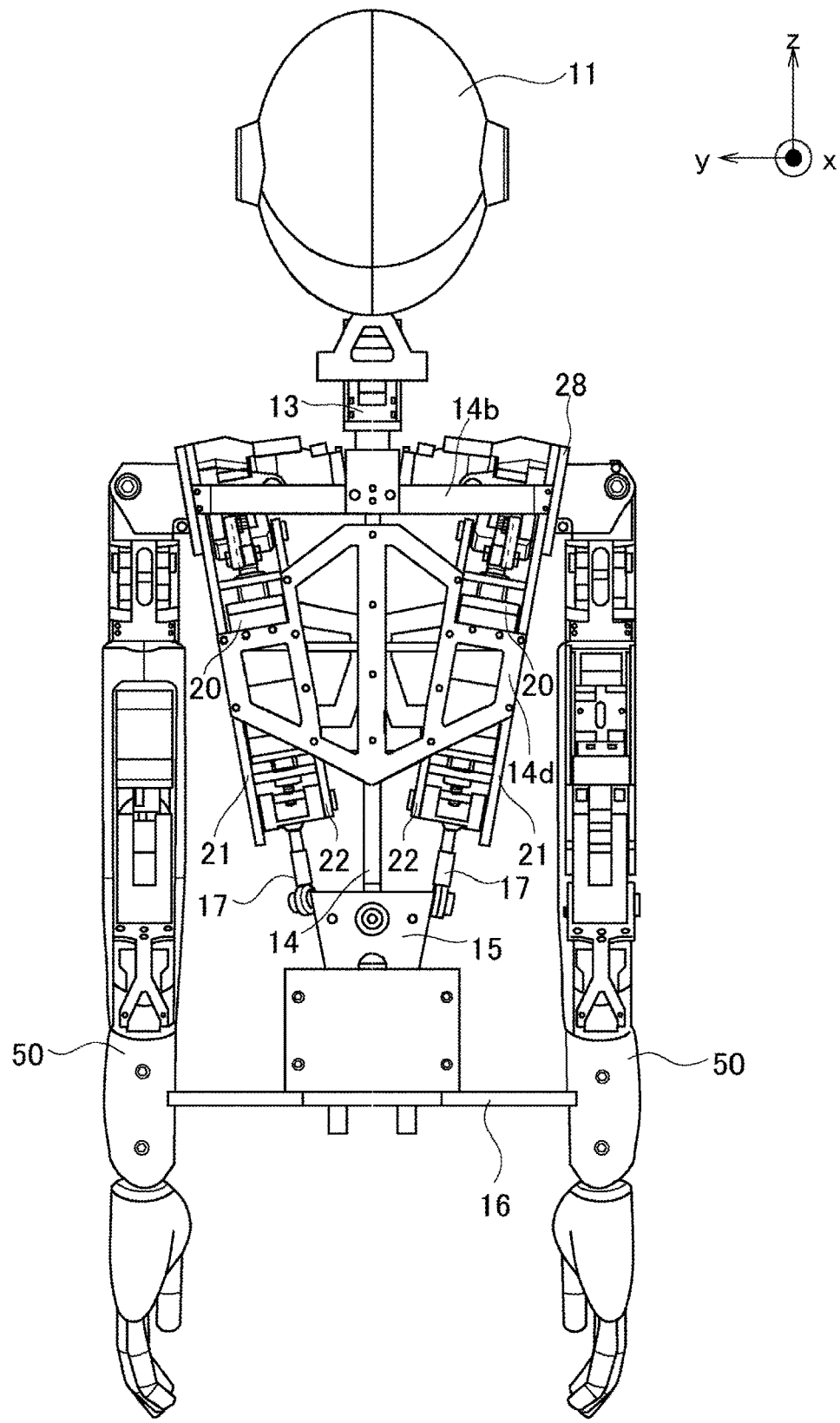
FIG. 3 is a rear elevation of the robot shown in FIG. 1.

Reference will be made to the overall construction of a robot 10 on which rotational driving mechanisms according to the present invention are mounted, based on FIGS. 1 through 3. FIG. 1 is a front elevation of the robot 10, FIG. 2 is a left side view of the robot 10, and FIG. 3 is a rear elevation of the robot 10. Also, note that in this embodiment, assuming that the direction of advancement of the robot 10 is set as a positive or plus direction of an x axis, and that a left hand direction as viewed from the robot 10 is set as a positive or plus direction of a y axis, and that an antigravity direction in the robot 10 is set as a positive or plus direction of a z axis, the x axis is a roll axis, and the y axis is a pitch axis, and the z axis is a yaw axis. Accordingly, a rotation around the x axis becomes a roll motion, and a rotation around the y axis becomes a pitch motion, and a rotation around the z axis becomes a yaw motion. In addition, an upward direction in this embodiment is the positive or plus direction on the z axis, i.e., the antigravity direction, and on the other hand, a downward direction is the negative or minus direction of the z axis, i.e., the gravity direction. A left and right direction is a left and right direction when viewed from the robot 10, wherein the positive or plus direction on the y axis becomes a left direction, and a negative or minus direction on the y axis becomes a right direction.

The robot 10 is a humanoid robot and has a body which imitates a skeletal structure of a human being. Schematically, the skeletal structure of an upper half body of the robot 10 (hereinafter, referred to simply as an "upper half body skeletal structure") is formed by: a backbone part 14 extending in a z axis direction in FIG. 1 and including various kinds of bone parts 14a-14d formed of sheet metal to be described later; a hip bone part 15 connected with the backbone part 14 so as to support the backbone part 14; and a pelvic part 16 further supporting the hip bone part 15, with a pair of unillustrated leg units of the robot 10 being connected thereto. Then, to the backbone part 14, there is connected a neck 13 of the robot 10, on which is further arranged a head 11. Here, note that a camera 12 for photographing outside is mounted on the head 11. Although it becomes possible for the head 11 to perform a roll motion and a yaw motion with respect to the backbone part 14 due to the connection of the head 11 with the backbone part 14 through this neck portion 13, the internal structure of the robot for these motions does not form the core of the present invention, and hence, the detailed explanation thereof is omitted in this description.

Figure 4:
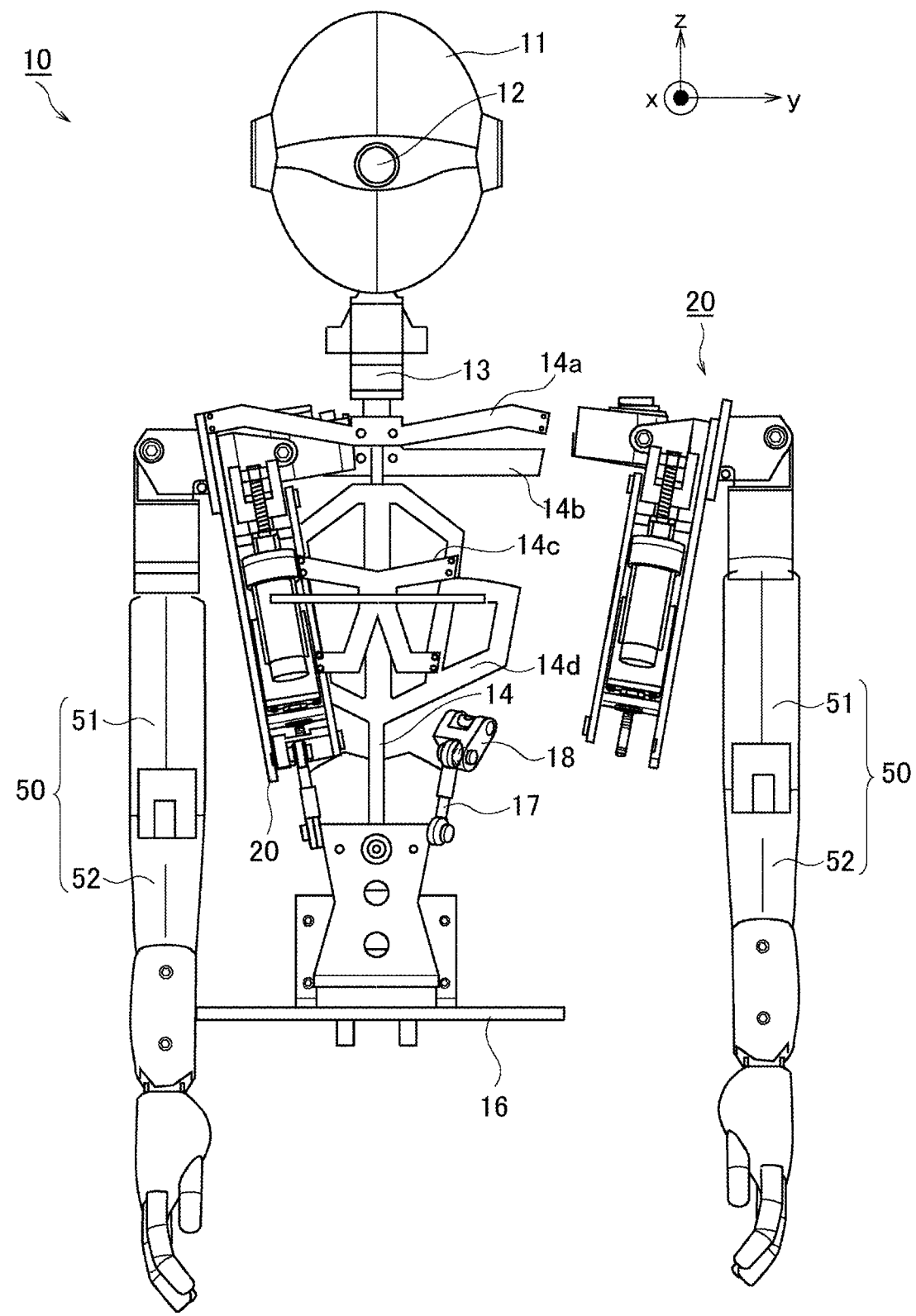
FIG. 4 is a view showing a state where an arm unit and a driving unit are removed, in the robot shown in FIG. 1.

In addition, in the robot 10, driving units 20 for managing the drive of the upper half of the body are arranged corresponding to an upper right half body and an upper left half body, respectively. Here, as shown in FIG. 4, an anterior clavicular part 14a at the front side of the robot and a posterior clavicular part 14b at the back side of the robot are connected to the backbone part 14 at locations positioned in shoulder parts of the robot 10. Moreover, an anterior sternal part 14c at the front side of the robot and a posterior sternal part 14d at the back side of the robot are connected to the backbone part 14 at locations positioned in a breast part (a portion lower than the shoulder parts) of the robot 10. By these bone parts 14a-14d and the backbone part 14, there are formed predetermined spaces at the right and left sides of the interior of the upper half of the body of the robot 10 across the backbone part 14, respectively, and the driving units 20 are arranged so as to be received in the predetermined spaces at the right and left sides, respectively, and are connected to the individual bone parts 14a-14d. Accordingly, the two driving units 20 are mounted in the interior of the robot 10. The bone parts 14a-14d are formed of flat plate-shaped sheet metal with respect to the backbone part 14, so the mounting of the driving units 20 to the backbone part 14 will be carried out relatively resiliently.

In FIG. 4, there is shown a state in which an arm unit 50 at the left-hand side of the robot 10 and the corresponding driving unit 20 for the upper left half body are removed in unison from the upper half body skeletal structure of the robot 10. Thus, the driving unit 20 is constructed so as to be removable from the upper half body skeletal structure of the robot 10 together with the corresponding arm unit 50, whereby assembly efficiency and maintenance of the robot 10 are kept in a suitable manner. Inside this driving unit 20, there are mounted an actuator for performing pitch rotation of the arm unit 50 and a transmission mechanism for transmitting an output of the actuator to the arm unit 50, but the driving unit 20 itself does not form the core of the present invention, and hence, the detailed explanation thereof is omitted in this description.

<Construction of Arm Unit 50>

Figure 5:
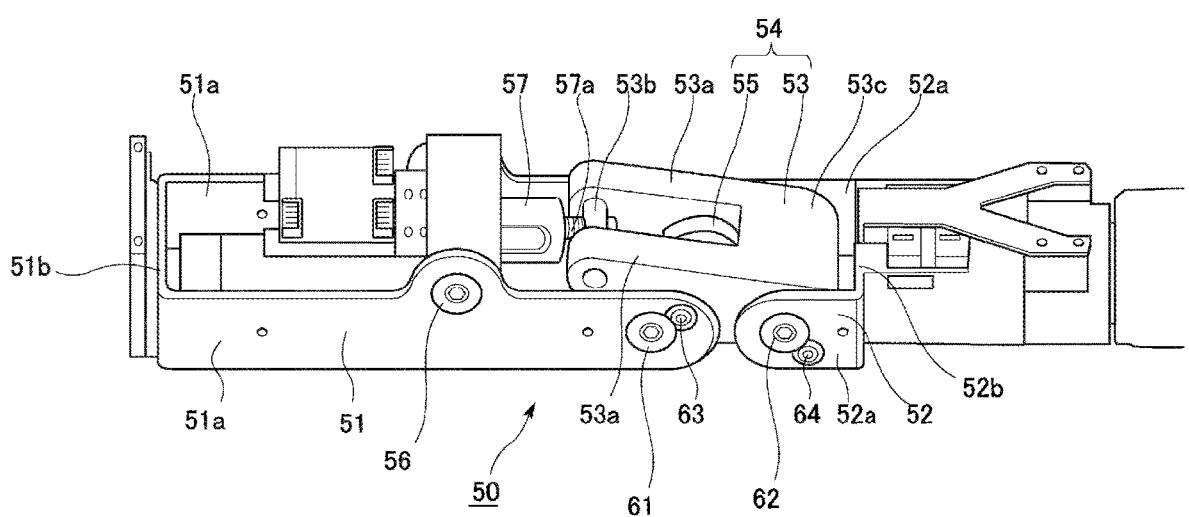
FIG. 5 is an external view of a rotational driving mechanism according to a first embodiment incorporated in the arm unit of the robot shown in FIG. 1.
Figure 6:
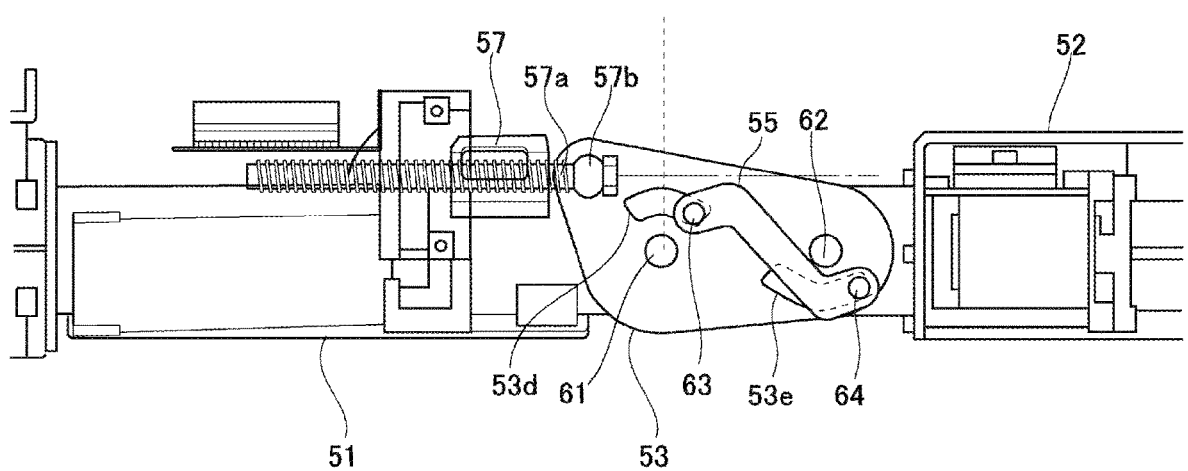
FIG. 6 is a first view showing a motion of a link member in the rotational driving mechanism shown in FIG. 5.
Figure 7:
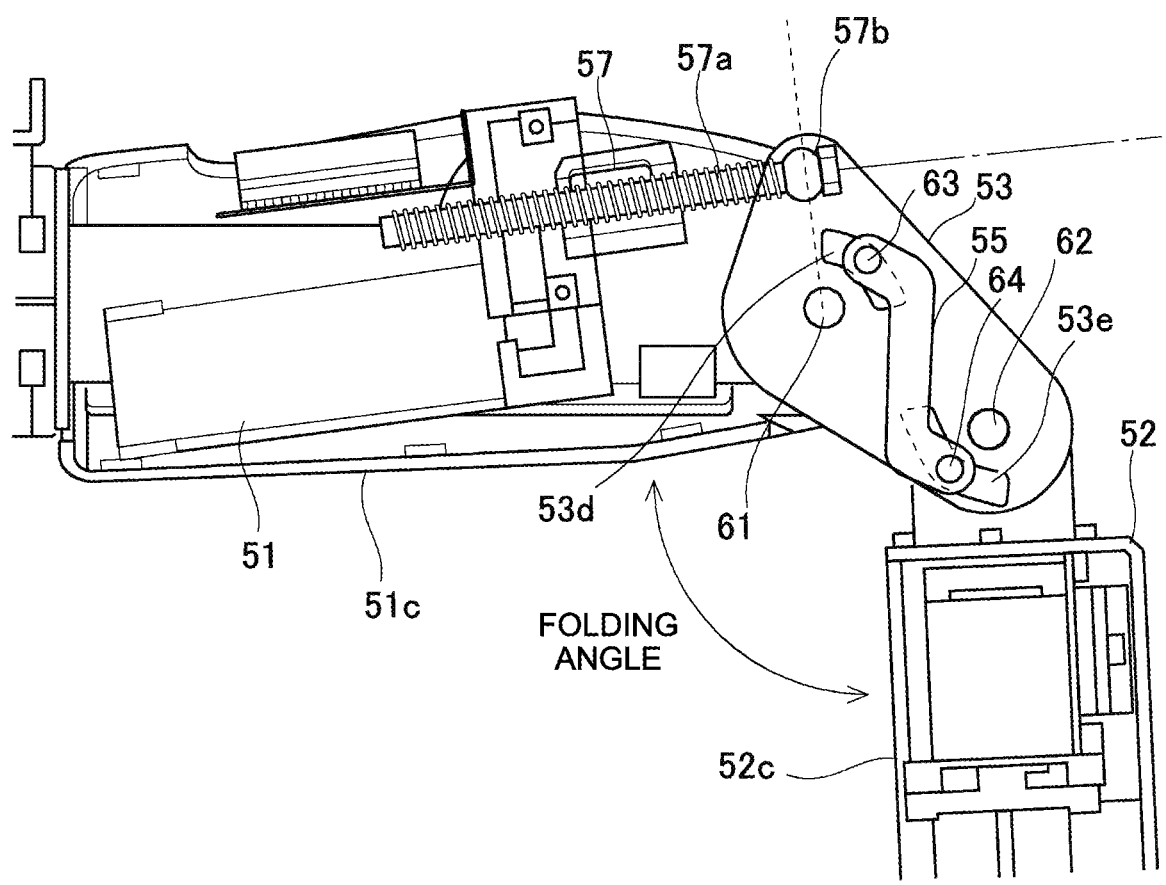
FIG. 7 is a second view showing the motion of the link member in the rotational driving mechanism shown in FIG. 5.
Figure 8:
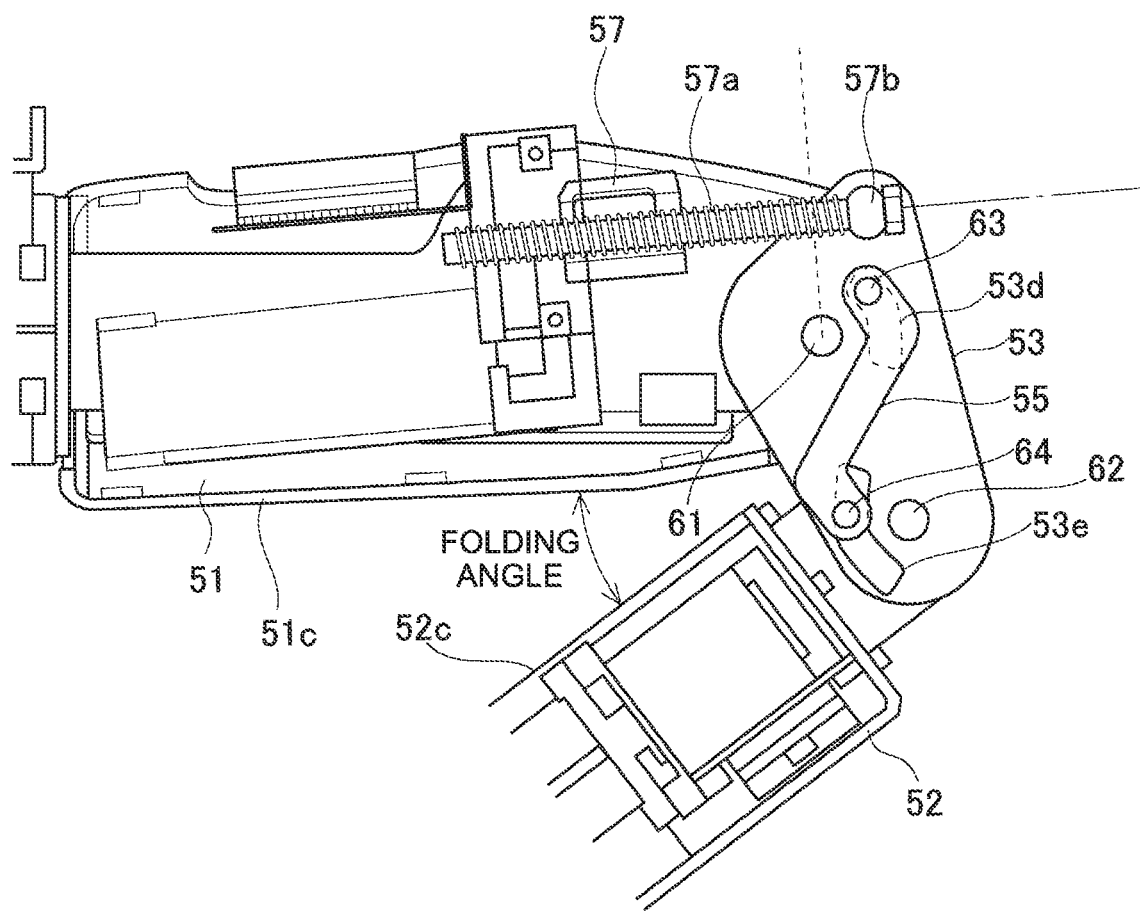
FIG. 8 is a third view showing the motion of the link member in the rotational driving mechanism shown in FIG. 5.

Here, the construction of the arm unit 50 will be explained based on FIG. 5 through FIG. 8. FIG. 5 is an external view showing a joint part or an elbow joint part 54 which controls relative rotational driving of two arm members, i.e., a first arm member 51 at the side of an upper arm, and a second arm member 52 at the side of a lower arm, which construct the arm unit 50. Here, note that in FIG. 5, the description of a cover member covering each arm member shown in FIG. 1, etc., is omitted so that it becomes easy to grasp the construction of the elbow joint part 54. In addition, FIG. 6 through FIG. 8 are views for explaining the motions of the first link unit 53 and the second link unit 55 which together form the elbow joint part 54, and are cross sectional views showing the first arm member 51, the second arm member 52 and the elbow joint part 54 in a cross section along a longitudinal direction of the arm unit 50.

The first arm member 51 has a pair of plate-shaped frames 51a extending along a longitudinal direction thereof and a base frame 51b to which the pair of plate-shaped frames 51a are connected. In addition, with respect to the second arm member 52, too, it similarly has a pair of plate-shaped frames 52a extending along a longitudinal direction thereof and a base frame 52b to which the pair of plate-shaped frames 52a are connected. Here, the distance between the plate-shaped frames 52a at the side of the second arm member 52 is set to be substantially the same as the distance between the plate-shaped frames 51a at the side of the first arm member 51. Then, an opening side in the longitudinal direction of the pair of plate-shaped frames 51a and an opening side in the longitudinal direction of the pair of plate-shaped frames 52a are arranged so as to oppose to each other. Thus, there is formed a space substantially surrounded by the pair of plate-shaped frames 51a, 52a and the base frames 51b, 52b, and in this surrounded space, there are accommodated an actuator 57 for driving to rotate the elbow joint part 54 and a linkage mechanism for the elbow joint part 54 corresponding to a rotational driving mechanism of the present invention, for transmitting an output of the actuator 57 to each arm member.

First, the actuator 57 will be explained. The actuator 57 is a linear motion actuator which has a servo-motor, a main body, and an output shaft 57a performing linear movement in the axial direction of the actuator. The output shaft 57a has a spiral thread groove formed on the outer peripheral surface thereof, and a ball screw nut (not shown) threadedly engaged with the thread groove of the output shaft 57a is received in the main body in such a state that only rotation thereof around an axis line of the main body is permitted. Then, the servo-motor is connected with the main body so as to drive the ball screw nut to rotate, and the movement in the axial direction of the ball screw nut is limited inside the main body, so the output shaft 57a is caused to perform linear motion in the axial direction, i.e., move linearly, by the drive of the servo-motor.

Then, the output shaft 57a of the actuator 57 is connected to the first link unit 53 among the first link unit 53 and the second link unit 55 which together constitute the elbow joint part 54. In addition, the first link unit 53 has two wall portions 53a extended in the same direction from the opposite ends of the base portion 53c, as shown in FIG. 5, and a bridge 53b is arranged to be parallel to the base portion 53c so as to connect both the wall portions 53a with each other. This first link unit 53 is supported by a bearing so as to be rotatable with respect to the first arm member 51, and a rotation shaft of the bearing is represented by 61, and is referred to as a first rotation shaft 61. Further, this first link unit 53 is also supported by a bearing so as to be rotatable with respect to the second arm member 52, and a rotation shaft of this bearing is denoted by 62, and is referred to as a second rotation shaft 62. Here, note that the first rotation shaft 61 and the second rotation shaft 62 are mutually parallel rotation shafts.

In addition, the output shaft 57b of the actuator 57 is connected to the bridge 53b in such a manner that the direction thereof with respect to the first link unit 53 becomes variable, wherein a connection point between the actuator output shaft and the bridge is denoted by 57b (refer to FIG. 6 through FIG. 8). Then, the actuator 57 is arranged between the pair of plate-shaped frames 51a of the first arm member 51, but the actuator 57 is supported by a bearing so as to be rotatable with respect to the first arm member 51, i.e., the pair of plate-shaped frames 51a, in such a manner that when an output from the actuator 57 is applied to the first link unit 53, as will be described later, the direction of the output shaft of the actuator 57 is adjusted appropriately according to the posture of the first link unit 53. A rotation shaft of this bearing is denoted by 56. That is, this rotation shaft 56 is to tilt the actuator 57 with respect to the first arm member 51 in an appropriate manner according to a displacement of the connection point 57b between the output shaft 57a and the bridge 53b due to the rotation of the first link unit 53 around the first rotation shaft 61.

The first link unit 53 constructed in this manner forms a biaxial joint which connects the first arm member 51 and the second arm member 52 with each other through the first rotation shaft 61 and the second rotation shaft 62, respectively, so as to be rotatable. At this time, the first rotation shaft 61 and the second rotation shaft 62 are separated from each other by a predetermined distance, so the first arm member 51 and the second arm member 52 being rotatable around their rotation shafts, respectively, are placed in a situation where they do not interfere with each other easily. However, the output shaft 57a of the actuator 57 is connected only to the side of the first link unit 53, and hence, the arrangement is not such that the output of the actuator 57 is directly transmitted to the second arm member 62. Accordingly, provision is made for the second link unit 55 which connects the first arm member 51 and the second arm member 52 with each other.

The second link unit 55 is one of link units which form the elbow joint part 54, as mentioned above. Specifically, the second link unit 55 is connected with a first support shaft 63 arranged so as to join between the pair of plate-shaped frames 51a of the first arm member 51, and a second support shaft 64 arranged so as to join between the pair of plate-shaped frames 52a of the second arm member 52. Here, the first support shaft 63 and the second support shaft 64 are arranged with respect to the first rotation shaft 61 and the second rotation shaft 62 in such a manner that a straight line connecting the first support shaft 63 and the second support shaft 64 on a rotational driving plane intersects a straight line connecting the first rotation shaft 61 and the second rotation shaft 62, and at the same time, the first support shaft 63 and the second support shaft 64 are made mutually parallel to the first rotation shaft 61 and the second rotation shaft 62, respectively. As a result of this, rotational driving of the first arm member 51, the second arm member 52, the first link unit 53 and the second link unit 55 by means of the actuator 57, to be described later, will be carried out on the same rotational driving plane. Then, the second link unit 55 maintains the center distance between both the support shafts at a fixed distance by connecting the first support shaft 63 and the second support shaft 64 by means of the link body thereof. By such a construction, it is possible to form correlation between the first arm member 51 and the second arm member 53 having their individual rotation shafts, whereby the second arm member 53 can be operatively connected with the output of the actuator 57. Here, note that the second link unit 55 is arranged so as to be sandwiched by the two wall portions 53a of the first link unit 53.

Here, the first support shaft 63 and the second support shaft 64 are each arranged so as to extend over the plate-shaped frames 51a, 52a which are in opposition to each other, as a result of which in a state where the elbow joint part 54 shown in FIG. 5 is formed, the first link unit 53 is formed in its inner portion with first guide through holes 53d into which the first support shaft 63 is inserted to pass therethrough in a shaft length (longitudinal) direction thereof, and second guide through holes 53e into which the second support shaft 64 is inserted to pass therethrough in a shaft length (longitudinal) direction thereof (refer to FIG. 6 through FIG. 8). More specifically, the first guide through holes 53d are formed in the two wall portions 53a of the first link unit 53, respectively, and the shape of each first guide through hole 53d is such that when the first link unit 53 rotates around the first rotation shaft 61, it extends along the locus of the first support shaft 63, and the length thereof in the extending direction becomes a first predetermined length. Accordingly, each first guide through hole 53d is a through hole which has a limited length in the direction extending as the locus of the first support shaft 63 at the time of the rotation of the first link unit 53, for example as shown in FIG. 6, and the ends of each first guide through hole 53d will exist at the opposite sides of the extending direction, respectively. For that reason, the relative movement of the first support shaft 63 with respect to the first link unit 53 becomes possible only in the range of the extending direction of the first guide through holes 53d.

Further, the second guide through holes 53e are formed in the base portions 53c of the first link unit 53, respectively, and the shape of each second guide through holes 53e is such that when the first link unit 53 rotates around the second rotation shaft 62, it extends along the locus of the second support shaft 64, and the length thereof in the extending direction becomes a second predetermined length. Accordingly, each second guide through hole 53e is a through hole which has a limited length in the direction extending as the locus of the second support shaft 64 at the time of the rotation of the first link unit 53, for example as shown in FIG. 6, and the ends of each second guide through hole 53e will exist at the opposite sides of the extending direction, respectively. For that reason, the relative movement of the second support shaft 64 with respect to the first link unit 53 becomes possible only in the range of the extending direction of the second guide through holes 53e. These first guide through holes 53d and these second guide through holes 53e correspond to guide through holes according to the present invention.

Here, the operation of the elbow joint part 54 formed by the first link unit 53 and the second link unit 55 as mentioned above will be explained, based on FIG. 6 through FIG. 8. FIG. 6 shows a state where the arm unit 50 is extended straightly, i.e., a state where the shaft center of the first arm member 51 and the shaft center of the second arm member 52 are located on a straight line in the rotational driving plane. Here, note that this state corresponds to a maximally extended state according to the present invention. Then, the output shaft 57a of the actuator 57 is extended to the side of the first link unit 53, whereby the second arm member 52 is gradually rotated and folded with respect to the first arm member 51 (a state shown in FIG. 7). Eventually, as shown in FIG. 8, there is formed a state where the second arm member 52 is most folded with respect to the first arm member 51, that is, a state where an angle (hereinafter, referred to as a "folding angle") formed by a rotation inner side surface 51c of the first arm member 51 and a rotation inner side surface 52c of the second arm member 52 becomes the smallest. Hereinafter, the operation of each link unit will be explained in detail.

In the maximally extended state shown in FIG. 6, the first arm member 51 and the second arm member 52 are in a straightly extended state. At this time, the first support shaft 63 at the side of the first arm member 51 is in a state where it abuts against a right-hand side end of the first guide through hole 53d (i.e., an end at the side of the second arm member 52) in FIG. 6. At the same time, the second support shaft 64 at the side of the second arm member 53 is in a state where it abuts against a right-hand side end of the second guide through hole 53e in FIG. 6. That is, the maximally extended state is a state where the first support shaft 63 and the second support shaft 64 are in abutment with the individual corresponding ends of the guide through holes 53d, 53e, respectively, and are prevented from movement, whereby they are in a state of being formed as the arm unit 50.

In addition, in the state where the first arm member 51 and the second arm member 52 are generally extended (i.e., a state corresponding to a predetermined extended state according to the present invention) including the maximally extended state, the connection point 57b is located, as shown in FIG. 6, at the left side with respect to the first rotation shaft 61 in a movable range along the extending direction of the output shaft 57a in the rotational driving plane (i.e., a direction indicated by an alternate long and short dash line in FIG. 6. Also, a perpendicular line with respect to the alternate long and short dash line from the first rotation shaft 61 is indicated by a broken line in this figure. Here, note that these are the same as in FIG. 7 and FIG. 8 to be described later.) Here, note that this movable range is a range which is specified by the condition that the connection point 57b is located at one end of the movable range (i.e., an end at the left side from an intersection of the broken line and the alternate long and short dash line, in other words, an end located at the side of the first arm member 52 with respect to the first rotation shaft 61) in the maximally extended state shown in FIG. 6, and that the connection point 57b is located at the other end of the movable range (i.e., at an end located at the right side from the intersection of the broken line and the alternate long and short dash line, in other words, an end located at the right side with respect to the first rotation shaft 61) in a maximally folded state shown in FIG. 8 to be described later. Accordingly, the connection point 57b is formed in such a manner as to be displaced to the opposite left and right sides of the first rotation shaft 61 along the extending direction of the output shaft 57a in the rotational driving plane. Thus, by setting the movable range of the connection point 57b in this manner, when the output shaft 57a is driven as will be described later, the tilt of the actuator 57 with respect to the first arm member 51 can be made as small as possible, thereby making it easy to avoid interference between the first arm member 51 and the second arm member 52 at the time of compacting or folding the first arm member 51.

From this maximally extended state, the output shaft 57a of the actuator 57 is pushed out or extended to the side of the first link unit 53 by the drive of the actuator 57, and the connection point 57b approaches the broken line in the figure (FIG. 7). In that case, when focusing on the first arm member 51, the first link unit 53 rotates in the clockwise direction around the first rotation shaft 61, as shown in FIG. 7. At this time, as mentioned above, the first rotation shaft 61, the second rotation shaft 62, the first support shaft 63 and the second support shaft 64 are arranged in such a manner that the straight line connecting the first support shaft 63 and the second support shaft 64 intersects the straight line connecting the first rotation shaft 61 and the second rotation shaft 62, and the first support shaft 63 and the second support shaft 64 are connected to each other by the second link unit 55. Accordingly, when rotation in the clockwise direction of the first link unit 53 takes place, an angular moment in the clockwise direction around the second rotation shaft 62 acts on the second arm member 52. As a result, when the folding angle gradually becomes smaller and takes the state shown in FIG. 7, for example, it becomes about 90 degrees. Here, note that in this state, the first support shaft 63 is positioned at a substantially middle portion of the extending length of the first guide through hole 53d, and the second support shaft 64 is positioned at a substantially middle portion of the extending length of the second guide through hole 53e. In addition, as the first link unit 53 rotates in the clockwise direction, the position of the connection point 57b between the output shaft 57a of the actuator 57 and the bridge 53b comes on the broken line in this figure (FIG. 7), and moves to a more upper position in comparison with the position shown in FIG. 6. However, the actuator 57 is mounted in such a manner as to be able to tilt with respect to the first arm member 51 around the rotation shaft 56, and so, for example, as shown in FIG. 7, even if the connection point 57b moves upward, the output from the actuator 57 is continued to be applied to the first link unit 53 in a suitable manner.

Then, when the output shaft 57a of the actuator 57 is further pushed out or extended to the side of the first link unit 53 and the connection point 57b is displaced to the right side of the broken line in this figure (FIG. 7), i.e., to the other end side of the movable range, the first link unit 53 is further rotated in the clockwise direction around the first rotation shaft 61, and in accordance therewith, the second arm member 52 is further rotated in the clockwise direction around the second rotation shaft 62, whereby the maximally folded state shown in FIG. 8 will be formed. Here, note that this maximally folded state is a state where the first support shaft 63 is in abutment with a left-hand side end of the first guide through hole 53d (i.e., an end at the side of the first arm member 51), whereby the movement of the first support shaft 63 within the first guide through hole 53d from the maximally extended state shown in FIG. 6 is prevented, thus forming the arm unit 50.

The elbow joint part 54 of the first arm member 51 and the second arm member 52 constructed in this manner serves to connect the first arm member 51 and the second arm member 52 with the first link unit 53 through the corresponding first rotation shaft 61 and the corresponding second rotation shaft 62, respectively. Then, the center distance between the first rotation shaft 61 and the second rotation shaft 62 is set as the predetermined distance, and so a region in which the rotation ranges of the individual arm members around the individual rotation shafts interfere with each other can be made as small as possible. As a result, a maximum folding angle in the arm unit 50 can be made as small as possible, without adding a large change to the shapes of the outer or external surfaces of the first arm member 51 and the second arm member 52, as shown in FIG. 8. In addition, the first arm member 51 and the second arm member 52 are connected with each other by the second link unit 55, whereby relative rotational driving of the first arm member 51 and the second arm member 52 biaxially joined with each other is achieved by means of the single linear motion actuator 57. As a result of this, the volume of the space occupied by the actuator for rotational driving of both the arm members can be made small.

Further, when the movable range of the connection point 57b is set as mentioned above, the connection point 57b and the first support shaft 63 are located in the rotational driving plane at the same side with respect to the straight line connecting the first rotation shaft 61 and the second rotation shaft 62. Here, it is constructed such that when the connection point 57b is displaced from the state shown in FIG. 6 to the state shown in FIG. 8, the second link unit 55 is rotated in the clockwise direction, and the straight line connecting the first rotation shaft 61 and the second rotation shaft 62 and the straight line connecting the first support shaft 63 and the second support shaft 64 intersect with each other. However, by setting the positions of the connection point 57b and the first support shaft 63 as mentioned above, when the second link unit 55 is rotated in the clockwise direction, the direction of rotation thereof becomes such that the second link unit 55 moves away from the first rotation shaft 61 and the second rotation shaft 62, thus becoming difficult to interfere with both of these shafts. This means that the range of relative rotational driving of the second arm member 52 with respect to the first arm member 51 can be obtained as widely as possible, and this can be the to be an extremely useful construction with respect to the rotational driving mechanism.

Moreover, in the relative rotational driving of the first arm member 51 and the second arm member 52, in the maximally extended state in which the arm unit 50 is most extended and in the maximally folded state in which the arm unit 50 is most folded, at least any of the first support shaft 63 and the second support shaft 64, to which the second link unit 55 is connected, is in abutment with an end of the corresponding guide through hole. As a result, it becomes possible to easily form stoppers which serve to mechanically limit the range of the relative rotational driving of the first arm member 51 and the second arm member 52, in other words, even with an easy or simple stopper construction, it will become possible to suppress inconveniences in the relative rotational driving of the first arm member 51 and the second arm member 52 such as, for example, rotational collision of the first arm member 51 and the second arm member 52, etc., in an appropriate manner.

<Modification>

Figure 9:
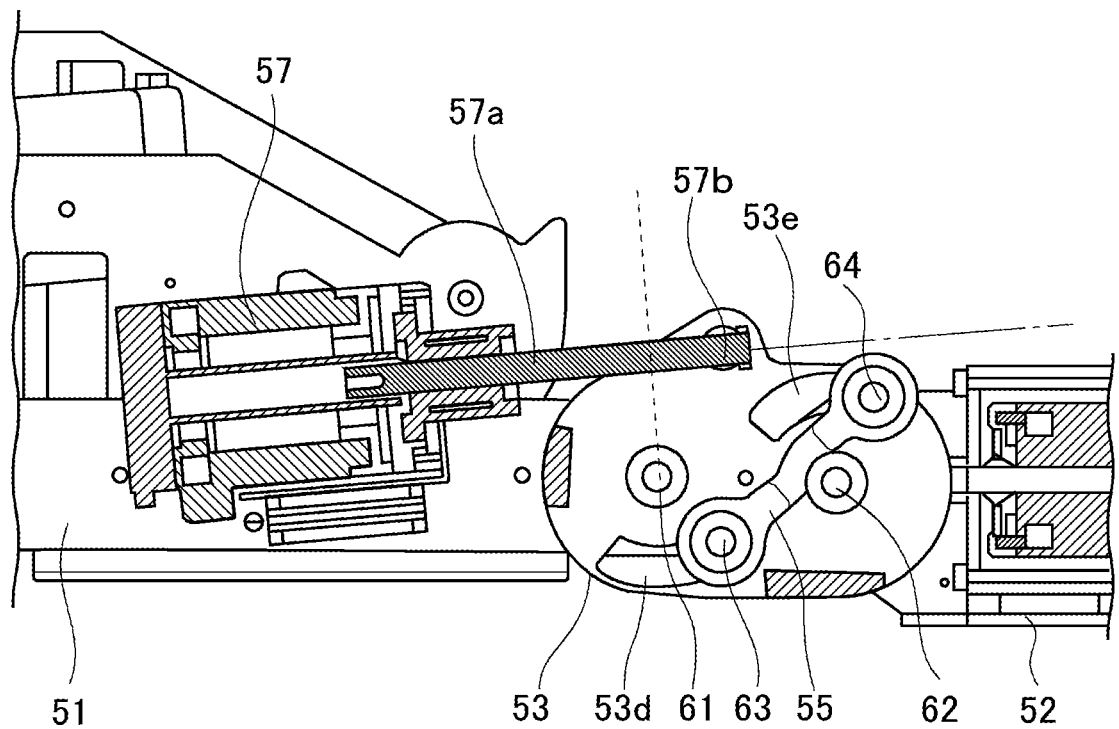
FIG. 9 is a first view showing a modification of the rotational driving mechanism according to the first embodiment of the present invention.
Figure 10:
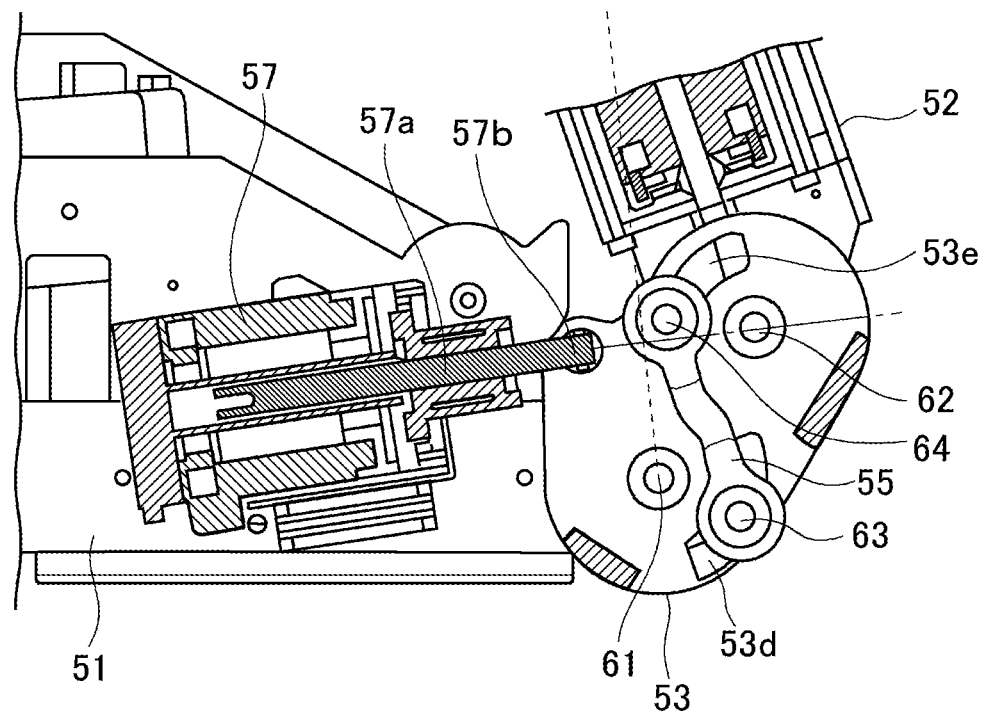
FIG. 10 is a second view showing the modification of the rotational driving mechanism according to the first embodiment of the present invention.

Reference will be made to a modification of the elbow joint part 54 based on FIGS. 9 through 10. FIG. 9 shows a state in which the arm unit 50 is placed in the maximally extended state, similar to FIG. 6, and FIG. 10 shows a state in which the arm unit 50 is placed in the maximally folded state, similar to FIG. 8. Here, note that in FIG. 9 and FIG. 10, structural components basically corresponding to those shown in FIG. 6 through FIG. 8 are denoted by the same reference numerals, and the detailed explanation thereof is omitted.

Here, this modification is different from the embodiment shown in FIG. 6 through FIG. 8 in the correlation between the position of the connection point 57b and the rotational state of each arm member. Specifically, in a state where the first arm member 51 and the second arm member 52 are generally extended, including a maximally extended state thereof, the connection point 57b is located, as shown in FIG. 9, at the right side with respect to the first rotation shaft 61 in a movable range along the extending direction of the output shaft 57a in the rotational driving plane (i.e., a direction indicated by an alternate long and short dash line in FIGS. 8 and 9. Also, a perpendicular line with respect to the alternate long and short dash line from the first rotation shaft 61 is indicated by a broken line in these figures.) Here, note that this movable range is a range which is specified by the condition that the connection point 57b is located at one end of the movable range (i.e., an end at the right side from an intersection of the broken line and the alternate long and short dash line, in other words, an end located at the side of the second arm member 52 with respect to the first rotation shaft 61) in the maximally extended state shown in FIG. 9, and that the connection point 57b is located at the other end of the movable range (i.e., at an end located at the left side from the intersection of the broken line and the alternate long and short dash line, in other words, an end located at the side of the first arm member 51 with respect to the first rotation shaft 61) in a maximally folded state shown in FIG. 10 to be described later. Accordingly, the connection point 57b is formed in such a manner as to be displaced to the opposite left and right sides of the first rotation shaft 61 along the extending direction of the output shaft 57a in the rotational driving plane. Thus, by setting the movable range of the connection point 57b in this manner, when the output shaft 57a is driven, the tilt of the actuator 57 with respect to the first arm member 51 can be made as small as possible, similarly to the embodiment shown in FIG. 6 through FIG. 8, thereby making it easy to avoid interference between the first arm member 51 and the second arm member 52 at the time of compacting or folding the first arm member 51.

From this maximally extended state, by the drive of the actuator 57, its output shaft 57a is drawn into the actuator 57, whereby the first link unit 53 is caused to rotate in the counterclockwise direction, and in accordance therewith, the second arm member 52 is rotated in the counterclockwise direction around the second rotation shaft 62. As a result, eventually, as shown in FIG. 10, the connection point 57b is located at the end at the left side of the broken line in this figure, i.e., at the leftmost end of the movable range, and thus, the maximally folded state is formed.

Thus, when the movable range of the connection point 57b is set in this manner, the connection point 57b and the first support shaft 63 are located in the rotational driving plane at the opposite sides, respectively, with respect to the straight line connecting the first rotation shaft 61 and the second rotation shaft 62. Here, it is constructed such that when the connection point 57b is displaced from the state shown in FIG. 9 to the state shown in FIG. 10, the second link unit 55 is rotated in the counterclockwise direction, so that the straight line connecting the first rotation shaft 61 and the second rotation shaft 62 and the straight line connecting the first support shaft 63 and the second support shaft 64 intersect with each other. However, by setting the positions of the connection point 57b and the first support shaft 63 as mentioned above, when the second link unit 55 is rotated in the counterclockwise direction, the direction of rotation thereof becomes such that the second link unit 55 moves away from the first rotation shaft 61 and the second rotation shaft 62, thus becoming difficult to interfere with both of these shafts. This means that the range of relative rotational driving of the second arm member 52 with respect to the first arm member 51 can be obtained as widely as possible, and this can be the to be an extremely useful construction with respect to the rotational driving mechanism.

Here, when comparing this modification with the above-mentioned embodiment, in the elbow joint part 54 according to this modification, the second arm member 52 will be folded with respect to the first arm member 51 by drawing in or retracting the output shaft 57a of the actuator 57, but on the other hand, in the elbow joint part 54 according to the above-mentioned embodiment, the second arm member 52 will be folded with respect to the first arm member 51 by pushing out or extending the output shaft 57a of the actuator 57. Thus, the correlation between the direction of linear motion of the output shaft 57a and the folding direction of the elbow joint part 54 is different between this modification and the above-mentioned embodiment, but as the elbow joint part 54 in the robot, it is only necessary to select and apply any of these modes suitably according to various reasons. For example, in cases where preferable friction characteristics are obtained in a specific direction of linear motion of the output shaft 57a in the actuator 57, the elbow joint part 54 with a wide rotational driving range can be formed by deciding, based on the above-mentioned disclosure, an arrangement of the connection point 57b and the first support shaft 63 in the rotational driving plane in that case, after deciding the direction of linear motion of the output shaft in consideration of the friction characteristics.

Embodiment 2

Figure 11:
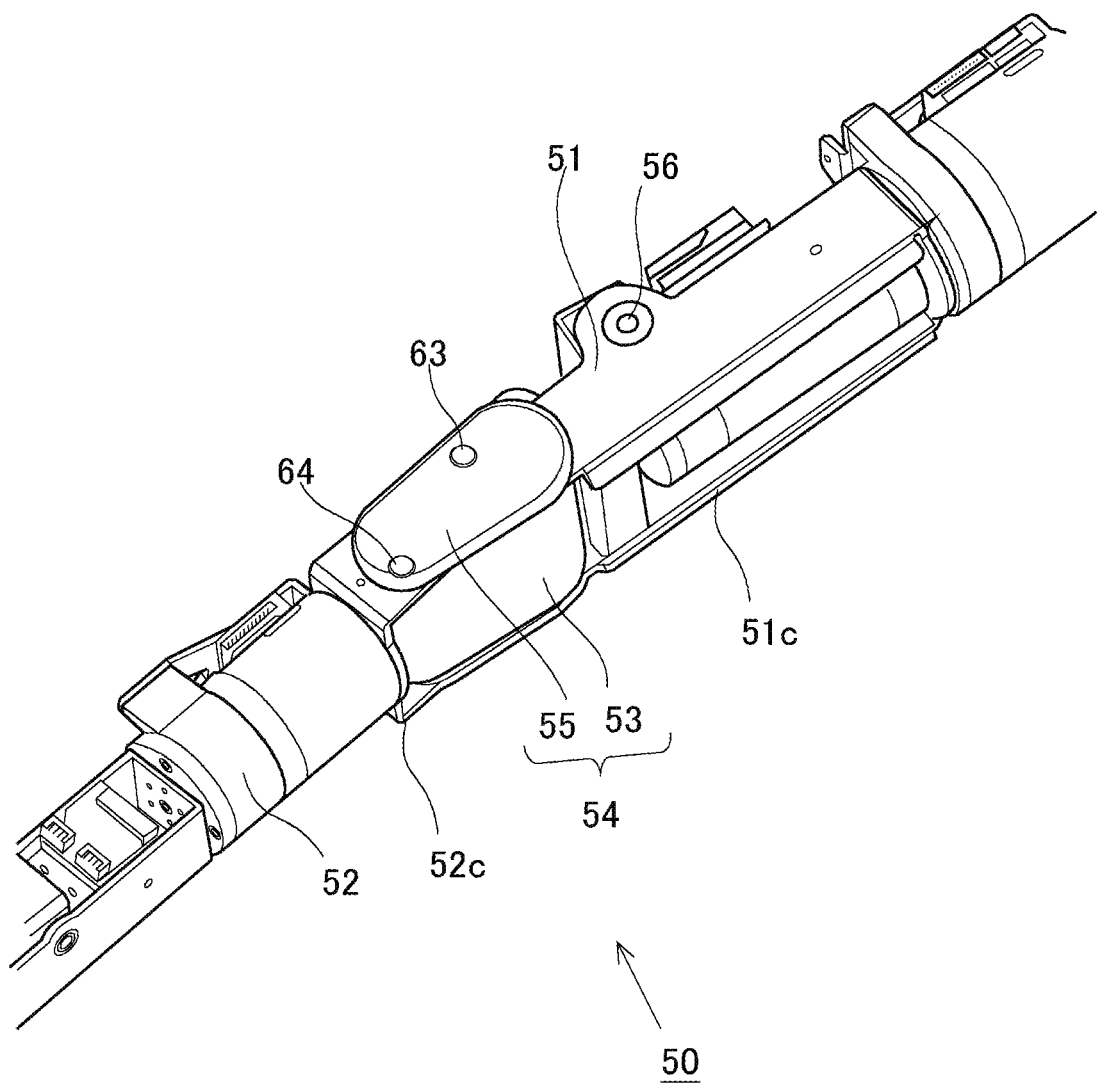
FIG. 11 is a first external view of a rotational driving mechanism according to a second embodiment incorporated in the arm unit of the robot shown in FIG. 1.
Figure 12:
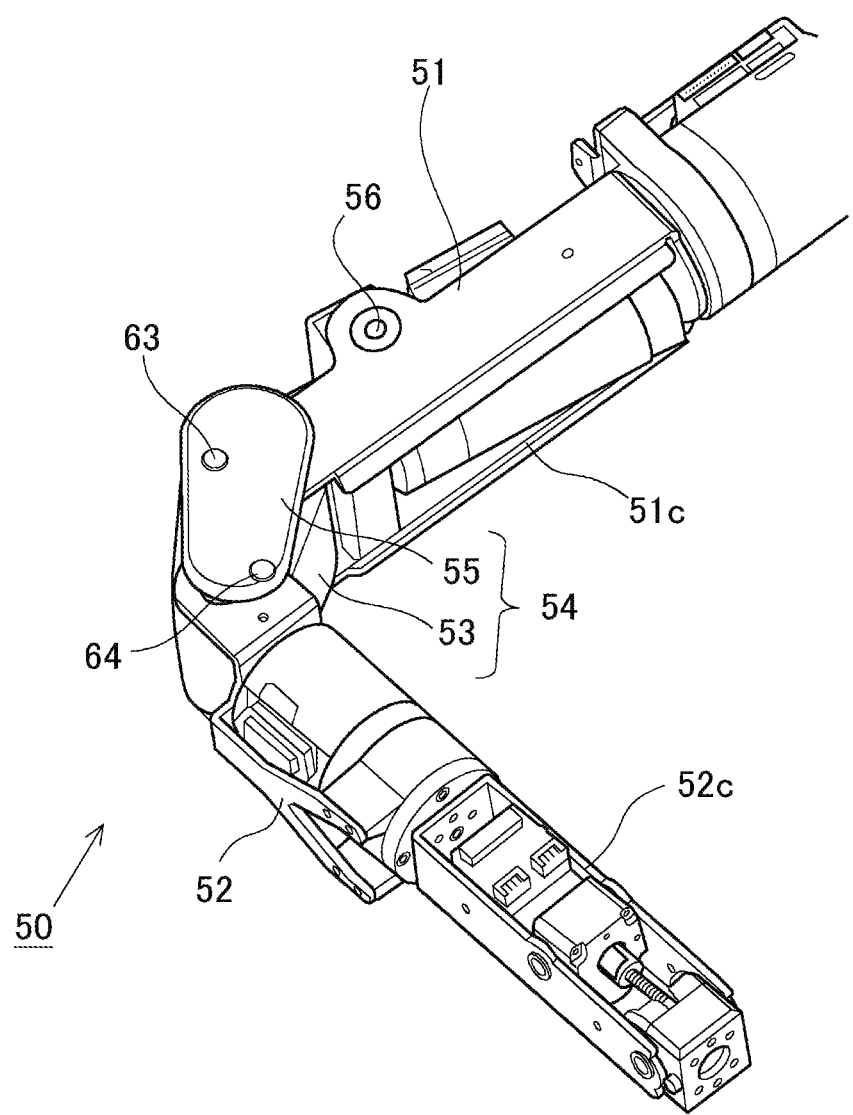
FIG. 12 is a second external view of the rotational driving mechanism according to the second embodiment incorporated in the arm unit of the robot shown in FIG. 1.

Now, reference will be made to a second embodiment of the present invention, based on FIG. 11 and FIG. 12. FIG. 11 shows the arm unit 50 in the maximally extended state, and FIG. 12 shows a state where the second arm member 52 is driven to rotate to some extent from the maximally extended state with respect to the first arm member 51, i.e., a folded state. Here, in the above-mentioned first embodiment, the second link unit 55 forming the elbow joint part 54 is arranged so as to be sandwiched between the two wall portions 53a of the first link unit 53, so that the elbow joint part 54 itself is in a state where it is received in a space between the plate-shaped frame 51a of the first arm member 51 and the plate-shaped frame 52a of the second arm member 52. Accordingly, in this second embodiment, the second link unit 55 forming the elbow joint part 54 is formed as a side plate on a side surface which is arranged outside the space and which is orthogonal with respect to the rotation inner side surfaces 51c, 52c. Thus, the second link unit 55 being formed as the side plate will not exist at a position where it interferes with the rotation inner side surfaces 51c, 52c, even if the arm unit 50 is in the folded state as shown in FIG. 12.

In the elbow joint part 54 constructed in this manner, the second link unit 55 as the side plate is connected with the first support shaft 63 and the second support shaft 64, and the first support shaft 63 and the second support shaft 64 are in a state where they are inserted in the guide through holes 53d, 53e (not shown in FIG. 11 and FIG. 12) which are arranged in the first link unit 51 and correspond to the individual support shafts, respectively, as in the above-mentioned first embodiment. Here, note that the connection of the first link unit 51 with the first arm member 51 and the second arm member 52 through the rotation shafts 61, 62 is the same as in the above-mentioned first embodiment, but each of the rotation shafts 61, 62 is located beneath the second link unit 55 as the side plate, and hence is not illustrated in the states shown in FIG. 11 and FIG. 12. Moreover, the correlation between the state of abutment of each of the support shafts with the ends of each of the guide through holes, and the posture of the arm unit 50 (e.g., the maximally extended state and the maximally folded state) is the same as in the first embodiment, and hence, the detailed explanation thereof is omitted. Thus, by forming the second link unit 55 as the side plate, as in the above-mentioned first embodiment, it is possible to make the maximum folding angle in the arm unit 50 as small as possible, without adding a large change to the shapes of the outer or external surfaces of the first arm member 51 and the second arm member 52, and it becomes possible to easily form stoppers which serve to mechanically limit the range of the relative rotational driving of the first arm member 51 and the second arm member 52.

Other Embodiments

In the embodiments thus far described, the elbow joint part 54 in the arm unit 50 has been exemplified as the rotational driving mechanism according to the present invention, but instead of this, the present invention may also be applied to knee joint parts in the leg units of the robot 10, i.e., a knee joint part for driving to rotate a thigh part and a crus part relative to each other, in cases where a leg unit is formed by the thigh part and the crus part. In addition, the present invention can also be applied to other joint parts, i.e., joint parts for connecting those members with each other which construct a robot and which are driven to rotate relative to each other.

REFERENCE SIGNS LIST

10 . . . robot,
14 . . . backbone part,
14a . . . anterior clavicular part,
14b . . . posterior clavicular part,
14c . . . anterior sternal part,
14d . . . posterior sternal part,
15 . . . hip bone part,
19 . . . spring,
20 . . . driving unit
50 . . . arm unit,
51 . . . first arm member,
51c . . . rotation inner side surface,
52 . . . second arm member,
52c . . . rotation inner side surface,
53 . . . first link unit
54 . . . elbow joint part,
55 . . . second link unit
56 . . . rotation shaft,
57 . . . actuator,
61 . . . first rotation shaft
62 . . . second rotation shaft
63 . . . first support shaft
64 . . . second support shaft

The invention claimed is:

1. A rotational driving mechanism in a robot, for driving a first member and a second member, which are part of the robot, to rotate relatively on a predetermined rotational driving plane by means of a linear motion actuator having an output shaft that moves linearly, the rotational driving mechanism comprising:
- a first link unit with which an output shaft of the linear motion actuator is connected, and which is arranged so as to be rotatable with respect to the first member through a first rotation shaft, and which is also arranged so as to be rotatable with respect to the second member side through a second rotation shaft, with a center distance between the first rotation shaft and the second rotation shaft being set to a predetermined distance which enables rotational driving of the first member and the second member on the predetermined rotational driving plane; and
- a second link unit which is connected with a first support shaft arranged at the first member side, and which is connected with a second support shaft arranged at the second member side, with a center distance between the first support shaft and the second support shaft being made constant;
- wherein the first support shaft and the second support shaft are arranged with respect to the first rotation shaft and the second rotation shaft in such a manner that a straight line connecting the first support shaft and the second support shaft intersects a straight line connecting the first rotation shaft and the second rotation shaft on the predetermined rotational driving plane, and
- the first link unit further has a guide through hole into which the first support shaft and the second support shaft are inserted in their shaft length directions, respectively, and which has a predetermined length formed in such a manner that the first support shaft and the second support shaft become able to relatively move along the predetermined rotational driving plane, and when an output from the linear motion actuator is applied, the first support shaft and the second support shaft are moved relative to each other by the guide through hole in an extending range of the guide through hole, respectively, whereby a relative rotational driving range of the first member and the second member is decided.

2. The rotational driving mechanism in a robot as set forth in claim 1, wherein
the movement of the first support shaft or the second support shaft in the guide through hole is prevented by the contact of the first support shaft or the second support shaft with an end of the guide through hole, whereby a maximally folded state is formed in which a rotation inner side surface of the first member and a rotation inner side surface of the second member in the predetermined rotational driving plane comes the closest to each other.

3. The rotational driving mechanism in a robot as set forth in claim 1, wherein
the movement of the first support shaft or the second support shaft in the guide through hole is prevented by the contact of the first support shaft or the second support shaft with an end of the guide through hole, whereby a maximally extended state is formed in which a shaft center of the first member and a shaft center of the second member in the predetermined rotational driving plane are positioned on the same straight line.

4. The rotational driving mechanism in a robot as set forth in claim 1, wherein
in the predetermined rotational driving plane, a connection point between the output shaft of the linear motion actuator and the first link unit is displaced in a movable range extending across the first rotation shaft along an extending direction of the output shaft;
when the first member and the second member are placed in a predetermined extended state, the connection point is located at the first member side in the movable range, and in the predetermined rotational driving surface, the connection point and the first support shaft are constructed in such a manner that they are located at the same side with respect to a straight line connecting the first rotation shaft and the second rotation shaft; and
by the displacement of the connection point from one end side to the other end side in the movable range, the second member is driven to rotate with respect to the first member.

5. The rotational driving mechanism in a robot as set forth in claim 1, wherein
in the predetermined rotational driving plane, a connection point between the output shaft of the linear motion actuator and the first link unit is displaced in a movable range extending across the first rotation shaft along an extending direction of the output shaft;
when the first member and the second member are placed in a predetermined extended state, the connection point is located at the second member side in the movable range, and in the predetermined rotational driving surface, the connection point and the first support shaft are constructed in such a manner that they are located at opposite sides, respectively, across a straight line connecting the first rotation shaft and the second rotation shaft; and
by the displacement of the connection point from one end side to the other end side in the movable range, the second member is driven to rotate with respect to the first member.

6. The rotational driving mechanism in a robot as set forth in claim 1, wherein
the first member and the second member are members forming an arm unit of the robot, respectively, and the first link unit and the second link unit form an elbow joint of the arm unit;
or, the first member and the second member are members forming a leg unit of the robot, respectively, and the first link unit and the second link unit form a knee joint of the leg unit.

7. A rotational driving mechanism in a robot, for driving a first member and a second member, which are part of the robot, to rotate relatively on a predetermined rotational driving plane by means of a linear motion actuator having an output shaft that moves linearly, the rotational driving mechanism comprising:
- a first link unit with which an output shaft of the linear motion actuator is connected, and which is arranged so as to be rotatable with respect to the first member through a first rotation shaft, and which is also arranged so as to be rotatable with respect to the second member side through a second rotation shaft, with a center distance between the first rotation shaft and the second rotation shaft being set to a predetermined distance which enables rotational driving of the first member and the second member on the predetermined rotational driving plane; and
- a second link unit which is connected with a first support shaft arranged at the first member side, and which is connected with a second support shaft arranged at the second member side, with a center distance between the first support shaft and the second support shaft being made constant;

wherein the first support shaft and the second support shaft are arranged with respect to the first rotation shaft and the second rotation shaft in such a manner that a straight line connecting the first support shaft and the second support shaft intersects a straight line connecting the first rotation shaft and the second rotation shaft on the predetermined rotational driving plane, and the second link unit is arranged in a state where it is sandwiched by the first link unit in a width direction of the first link unit.

8. The rotational driving mechanism in a robot as set forth in claim 7, wherein the first link unit further has a guide through hole into which the first support shaft and the second support shaft are inserted in their shaft length directions, respectively, and which has a predetermined length formed in such a manner that the first support shaft and the second support shaft become able to relatively move along the predetermined rotational driving plane, and when an output from the linear motion actuator is applied, the first support shaft and the second support shaft are moved relative to each other by the guide through hole in an extending range of the guide through hole, respectively, whereby a relative rotational driving range of the first member and the second member is decided.

9. A rotational driving mechanism in a robot, for driving a first member and a second member, which are part of the robot, to rotate relatively on a predetermined rotational driving plane by means of a linear motion actuator having an output shaft that moves linearly, the rotational driving mechanism comprising:

a first link unit with which an output shaft of the linear motion actuator is connected, and which is arranged so as to be rotatable with respect to the first member through a first rotation shaft, and which is also arranged so as to be rotatable with respect to the second member side through a second rotation shaft, with a center distance between the first rotation shaft and the second rotation shaft being set to a predetermined distance which enables rotational driving of the first member and the second member on the predetermined rotational driving plane; and a second link unit which is connected with a first support shaft arranged at the first member side, and which is connected with a second support shaft arranged at the second member side, with a center distance between the first support shaft and the second support shaft being made constant;

wherein the first support shaft and the second support shaft are arranged with respect to the first rotation shaft and the second rotation shaft in such a manner that a straight line connecting the first support shaft and the second support shaft intersects a straight line connecting the first rotation shaft and the second rotation shaft on the predetermined rotational driving plane, and the second link unit is arranged outside the first link unit in a width direction of the first link unit, and is formed as a side plate which is arranged at a further outer side of an outer surface of the first member and an outer surface of the second member.

\* \* \* \* \*

UNITED STATES PATENT AND TRADEMARK OFFICE
CERTIFICATE OF CORRECTION

PATENT NO. : 10,576,624 B2
APPLICATION NO. : 15/522548
DATED : March 3, 2020
INVENTOR(S) : Masaki Nagatsuka Page 1 of 1

It is certified that error appears in the above-identified patent and that said Letters Patent is hereby corrected as shown below:

On the Title Page

Item (30), Foreign Application Priority Data delete:
"Oct. 28, 2014 (JP) ............................. 2014-219175"

Insert:
--Oct. 28, 2014 (JP) ............................. 2014-219175
Oct. 22, 2015 (JP) ................................ 2015-208410--

Signed and Sealed this
Twenty-sixth Day of May, 2020

Andrei Iancu
*Director of the United States Patent and Trademark Office*